(12) United States Patent
He

(10) Patent No.: US 6,772,950 B2
(45) Date of Patent: Aug. 10, 2004

(54) SYSTEM AND METHOD FOR AN IMAGE CAPTURING NETWORK

(75) Inventor: Duanfeng He, South Setauket, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 10/335,002

(22) Filed: Dec. 30, 2002

(65) Prior Publication Data

US 2004/0056100 A1 Mar. 25, 2004

Related U.S. Application Data

(60) Provisional application No. 60/411,843, filed on Sep. 19, 2002.

(51) Int. Cl.[7] ................................................. G06K 7/10

(52) U.S. Cl. .................... 235/470; 235/476; 235/462.1; 235/462.17; 235/462.3; 235/462.48

(58) Field of Search ......................... 235/462.1, 462.11, 235/462.17, 462.3, 462.48, 470, 476, 472.01, 462.41, 462.24, 462.45, 462.22, 462.31, 462.32; 902/1, 6

(56) References Cited

U.S. PATENT DOCUMENTS

| | | | | |
|---|---|---|---|---|
| 5,155,341 A | * | 10/1992 | Ohtani et al. | 235/375 |
| 5,260,554 A | * | 11/1993 | Grodevant | 235/462.31 |
| 5,430,276 A | * | 7/1995 | Ohtani et al. | 235/375 |
| 6,223,292 B1 | * | 4/2001 | Dean et al. | 713/202 |
| 6,281,874 B1 | * | 8/2001 | Sivan et al. | 345/660 |
| 6,336,587 B1 | * | 1/2002 | He et al. | 235/462.45 |

FOREIGN PATENT DOCUMENTS

JP 2002135451 A * 5/2002 .......... H04M/11/00

* cited by examiner

Primary Examiner—Thien M. Le
Assistant Examiner—Daniel Walsh
(74) Attorney, Agent, or Firm—Fay Kaplun & Marcin, LLP (57) ABSTRACT

Described are a system and method for monitoring a location. The system may include a scanner having a digital imager, a processor and a communication device. The scanner is situated at the location. The system also may include a computing arrangement for accessing the scanner. The processor detects when the scanner is in a scanning mode in which information encoded on a scanned item is decoded. When the scanner is detected not to be in the scanning mode, the processor controls the digital imager to operate in a monitoring mode in which images of the location are generated for output to the computing arrangement via the communication device.

32 Claims, 5 Drawing Sheets

SYSTEM AND METHOD FOR AN IMAGE CAPTURING NETWORK

PRIORITY CLAIM

This application claims the benefit of U.S. Provisional Patent Application Serial No. 60/411,843 filed on Sep. 19, 2002 and entitled "Scanner/Webcam Interface." This application is expressly incorporated herein, in its entirety, by reference.

BACKGROUND

A growing number of scanning devices (i.e., barcode scanners) bear some similarities to cameras since both devices acquire images. However, scanners only capture images (e.g., scan barcodes) at a short distance, while conventional camera are more effective at longer ranges. Unlike conventional cameras, which are mostly analog, barcode scanners produce digital images, which allow a barcode scanner to easily communicate with another digital device (e.g., computer).

Some imaging code scanners have a dual functionality of both decoding barcodes and taking general pictures. The scanner employs the two funcitonalities by switching between them through mechanical means. One embodiment of such a scanner is shown in U.S. Pat. No. 6,336,587.

SUMMARY OF THE INVENTION

Described are a system and method for monitoring a location. The system may include a scanner having a digital imager, a processor and a communication device. The scanner is situated at the location. The system also may include a computing arrangement for accessing the scanner. The processor detects when the scanner is in a scanning mode in which information encoded on a scanned item is decoded. When the scanner is detected not to be in the scanning mode, the processor controls the digital imager to operate in a monitoring mode in which images of the location are generated for output to the computing arrangement via the communication device.

BRIEF DESCRIPTION OF THE DRAWINGS

The accompanying drawings are included to provide a further understanding of the invention and are incorporated in and constitute part of the specification, illustrate several embodiments of the invention and, together with the description, serve to explain examples of the present invention. In the drawings.

DETAILED DESCRIPTION

The present invention is directed to a system and method for integrating an Image Capturing Arrangement into a digital network.

Figure 1:
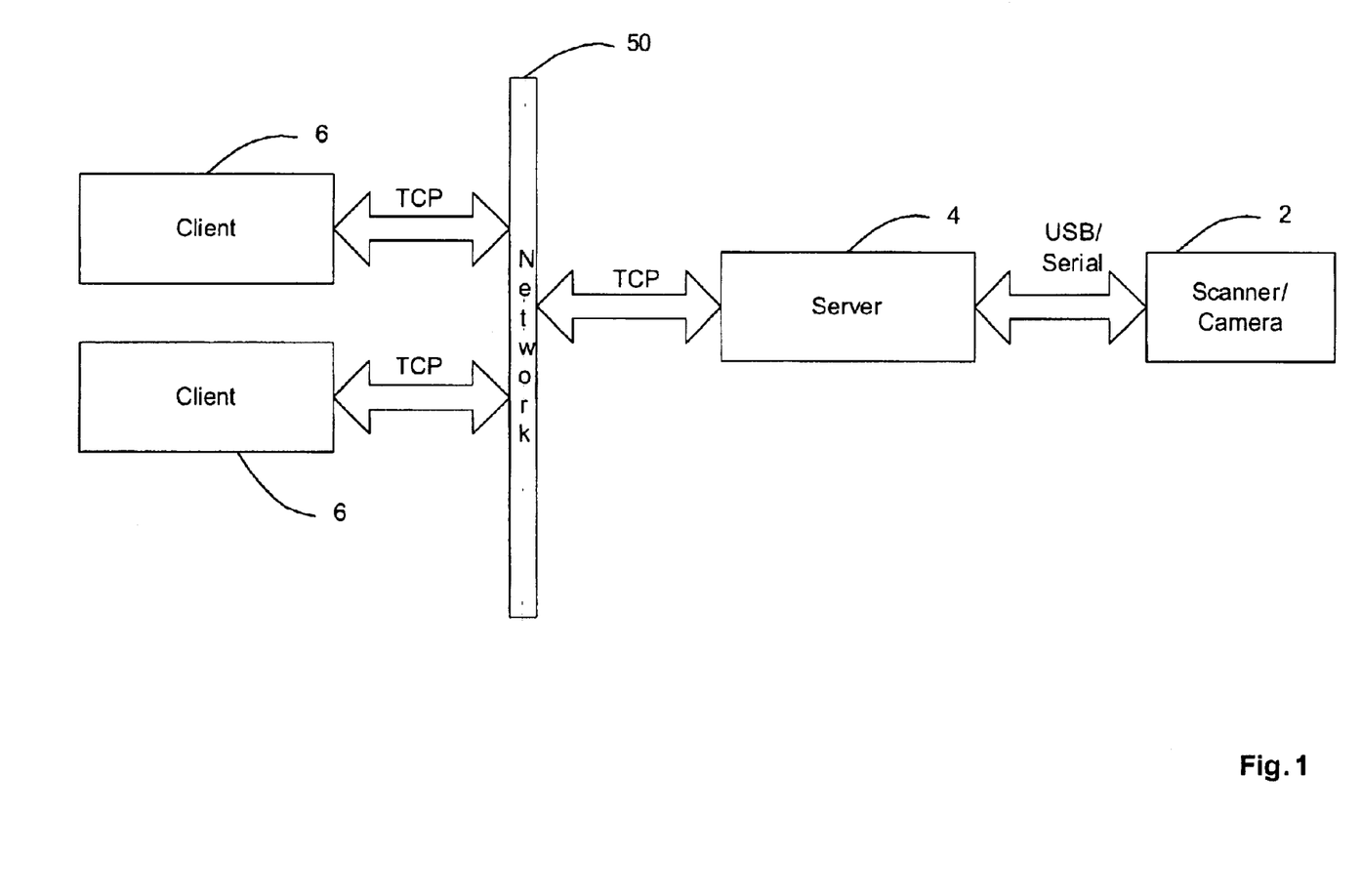
FIG. 1 shows an exemplary embodiment of a system according to the present invention.

FIG. 1 shows an exemplary embodiment of a system 1 according to the present invention in which an Image Capturing Arrangement ("ICA") 2 (e.g., a scanner with image capturing capabilities) communicates with a server 4 and any number of clients 6 connected through a communication network 50. The ICA 2 includes an image capturing device that is capable of capturing images, such as images of barcodes and images of objects as is done with a standard camera. The ICA 2 may preferably include lenses in a bifocal arrangement so that images of objects at varying distances (e.g., near or far) may be clearly captured. Therefore, the ICA 2 may capture images of barcodes which are relatively close as well as capture images of objects that are further away (e.g., acting as a security camera). After capturing images, the ICA 2 transmits them to the server 4.

The server 4 communicates with the ICA 2. The server 4 may be any computer (e.g., PC, laptop, workstation, etc.) that is capable of running a variety of server software required to communicate with the client 6 and the ICA 2. If the ICA 2 is a "stand-alone" device, the ICA 2 may be connected to the server 4 using any plurality of conventional digital communication standards (e.g., USB, IEEE-1394, serial connection, etc.) Alternatively, the ICA 2 and the server 4 may be physically integrated into one housing to form a single physical device, in which case the USB or serial connection between the server 4 and the ICA 2 may be replaced by a direct electronic connection. The server 4 is connected to the network 50 using, for example, the Transfer Communications Protocol (TCP). TCP is a widely used protocol primarily found in local area networks (LAN).

The network 50 allows any number of servers 4 or clients 6 to be simultaneously connected. Those skilled in the art will recognize that this arrangement provides for a number of alternative in which the clients 6 and the servers 4 may be connected to each other. For instance, if there are a number of servers 4 connected to the network 50, any client 6 may view the data captured by all the servers 4. Alternatively, if there are a number of clients 6 connected to the network 50, all of those clients 6 may view the images transmitted by the servers 4.

The client 6 may also be connected to the network 50 using the same protocol, such as TCP. Similar to the server 4, the client 6 may be a computer (e.g., PC, laptop, handheld, etc.) capable of communicating with the server 4 and analyzing and/or displaying the data captured by the ICA 2. The client 6 may run any client software that may be used in communicating with the server 4, displaying the data captured by the ICA 2, as well as any other client software that the system 1 according to the present invention requires.

Figure 2:
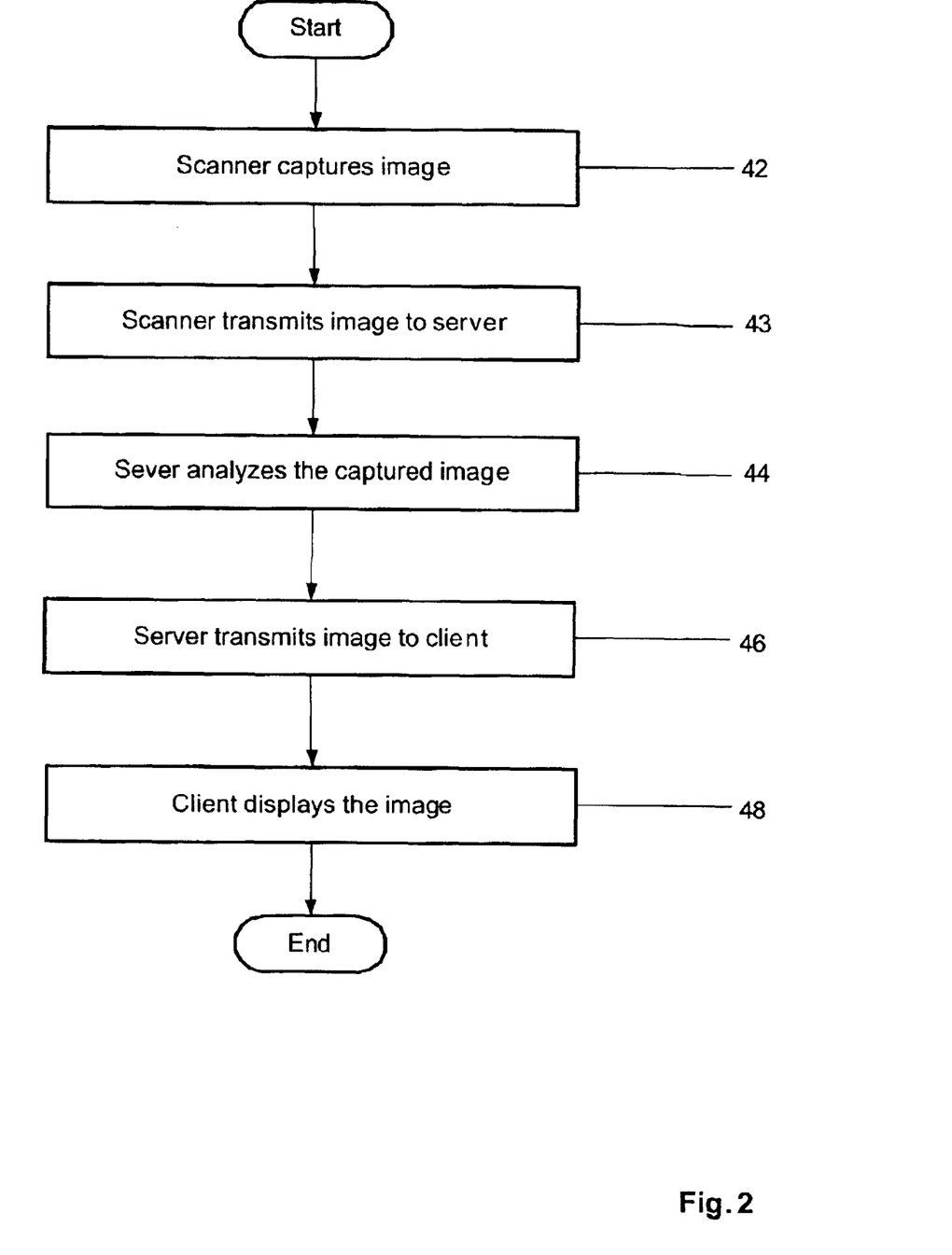
FIG. 2 shows a flow chart illustrating an exemplary embodiment of a method for the communications between an Image Capturing Arrangement and other devices according to the present invention.

FIG. 2 shows a general method according to the present invention for transmission and display of the data captured by the ICA 2 to the client 6. In step 42, the ICA 2 captures an image which may be a barcode or other data or an image (e.g., a photograph). The capturing process may be initiated in a number of ways. For instance, the ICA 2 maybe operated locally (e.g., an employee may use the ICA 2 to capture barcode labels or take pictures), remotely (e.g., an employee may use the client 6 to operate the ICA 2 to scan the labels or pictures), or automatically (e.g., the ICA 2 may be stationary and after a period of inactivity may begin taking pictures).

In step 43, the ICA 2 transmits the image or the barcode to the server 4. The server 4 communicates with the ICA 2 using specialized software located therein. In step 44, the server 4 analyzes the data captured by the ICA 2 in order to determine if it is a barcode or an image. Determining whether the data is of one type or another depends on the preferences of the client 6. The client 6 may be only interested in viewing, for example, the images and not barcodes. Therefore, the server 4 would be used to filter the unwanted data and transmit only the desired data.

In step 46, the server 4 transmits the desired data to the client 6 through the network 50. Both the client 6 and the server 4 have specialized software that is used in communicating with each other. In step 48, the client 6 displays the images transmitted by the server 4 using specialized client software.

The ICA 2, the server 4 and the client 6 may have a variety of roles and functions. Each of the embodiments discussed below and illustrated in FIGS. 3–5 vary based on the amount of access that the client 6 has to the ICA 2. In the first exemplary embodiment, shown in FIG. 3, the client 6 observes the images that the ICA 2 captures. In the second exemplary embodiment, shown in FIG. 4, the client 6 observes all the data captured by the ICA 2, including decoded text from barcodes and captured images of objects. In the third exemplary embodiment, shown in FIG. 5, the client 6 observes all the data captured by the ICA 2 as well as controls the ICA 2 from a remote location.

The client 6 may receive images from a plurality of the ICAs 2. These images may be displayed on a single display of the client 6. In order to control bandwidth and a response time, the subsampled images that are reduced in size may be first provided to client 6. For example, the ICAs 2 may provide only every fifth images and this is only a quarter of the regular sized image. If client 6 is interested in a particular image, then upon making the selection, the corresponding ICA 2 provides ether a single full sized image, or a sequence of higher-resolution images at the highest possible repetition rate. This allows lower the bandwidth necessary to deliver images and expedite the response time for selecting and providing the images to the client 6.

Figure 3:
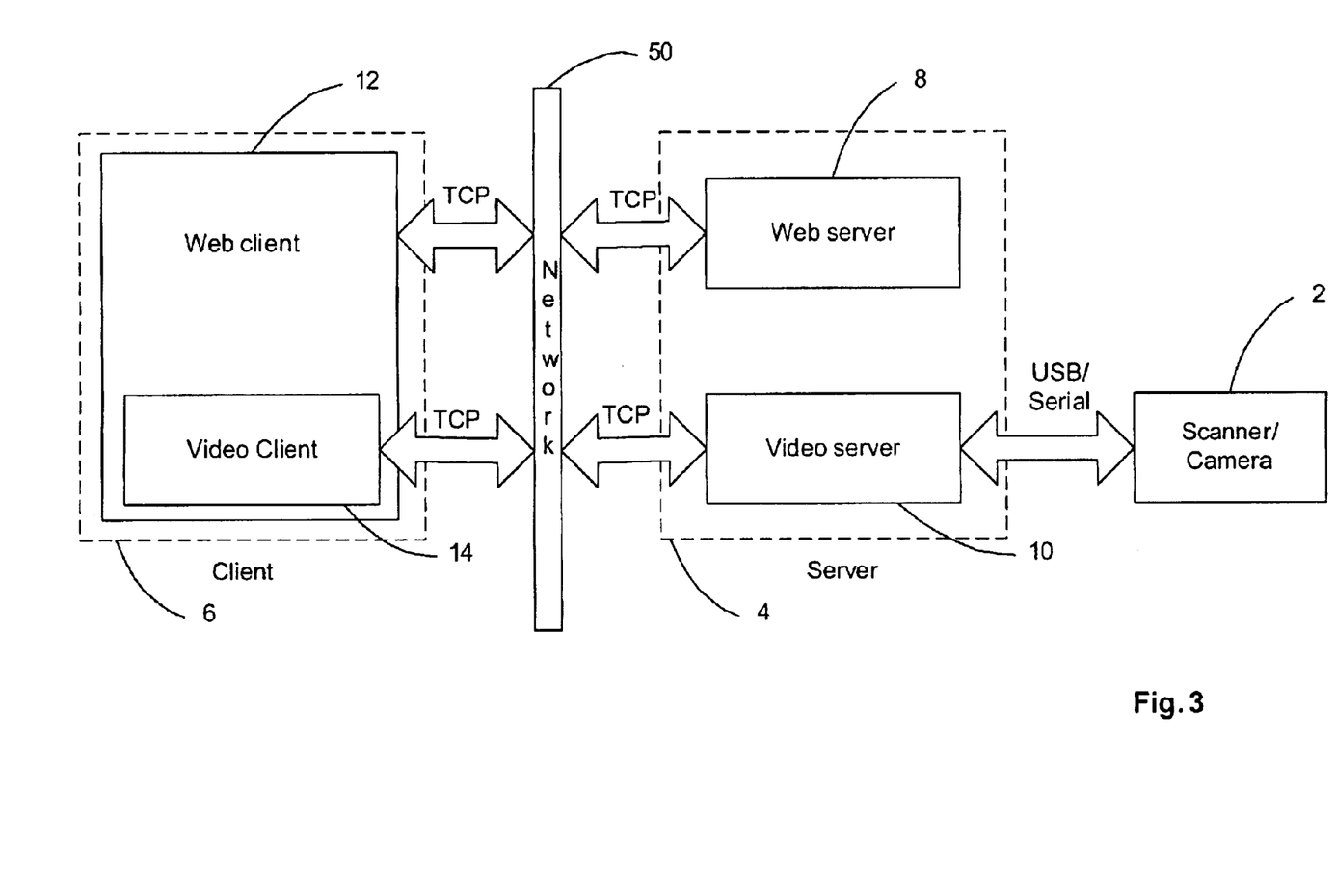
FIG. 3 shows another exemplary embodiment of a system according to the present invention including a video server.

FIG. 3 shows the first exemplary embodiment of the present invention. The server 4 contains two server programs, a web server 8 and a video server 10. The client 6 contains two client programs: a web client 12 (e.g., Microsoft Internet Explorer) and a video client 14 (e.g., in the form of a Java applet which is embedded in the web client 12).

The web client 12 is preferably capable of running some sophisticated user program (e.g., written in Java) so that it is capable of displaying the video client 14 and other content (e.g., time and location of the picture being shown by the video client 14) based on the information transmitted from the web server 8. The video client 14 displays the images directly received from the video server 10.

The web server 8 provides the client 6 with the video client 14. The web server 8 specifies the position of the video client 14, as well as its shape, size and other attributes. The web server 8 also provides the web client 12 with other content. For instance, the web server 8 may provide normal web pages unrelated to the video images being served, a camera location description or other information related to the video/images being served.

The Java language may preferably be used to write the video client 14 since the Java language provides the highest level of cross-platform compatibility (e.g., a PC server and a MAC client can still communicate). While programs written using the Java language provide a high level of cross-platform compatibility, they are relatively slow when compared to similar programs written in high-level languages (e.g., C, C++, etc.). Therefore, traditional high-level languages may be used to write the web server 8 so that the web server 8 is sufficiently fast and powerful.

The video server 10 has a dual purpose. First, the video server 10 communicates with the ICA 2 to obtain captured images. Second, the video server 10 then communicates with the video client 14 to transmit the captured video images thereto.

The video server 10 is operational only during periods when the ICA 2 is not being used to capture barcodes, and is instead acting as a camera. It is preferred that the activation or deactivation of the video server 10 may be contingent on whether the ICA 2 is being used as a camera. It may be beneficial for the ICA 2 to switch between its dual functions (e.g., scanner and camera) automatically. For instance, when the ICA 2 is not being utilized to capture barcodes and is in standby mode, it may automatically switch into camera mode. The camera mode may then continue running until the ICA 2 is reactivated for decoding barcodes. Simultaneous performance of the ICA's 2 dual functions is impractical. First, it is cumbersome to transmit scanned barcodes and captured photographic images simultaneously because data transmission rates would be significantly decreased. Second, there is little utility in viewing the text of decoded barcodes and the related images simultaneously. Third, the transmission of images would reduce the processing power of the barcode scanning and, thus, making it less responsive when it is decoding barcodes.

Figure 4:
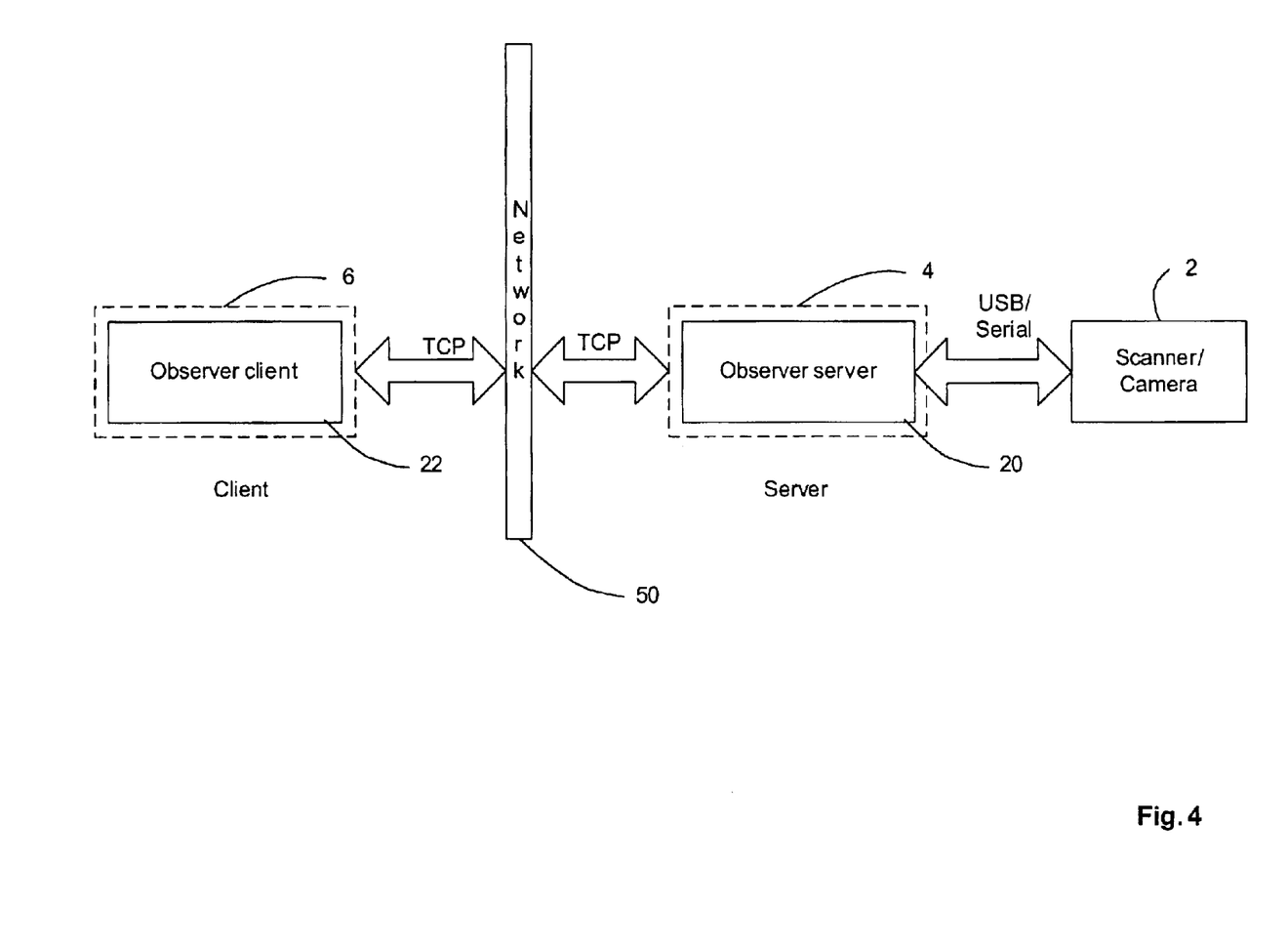
FIG. 4 shows yet another exemplary embodiment of a system according to the present invention including an observer server.

FIG. 4 shows a second exemplary embodiment of the present invention. The second embodiment is substantially similar to the first one shown in FIG. 3 except for the server and client software contained within the server 4 and the client 6. The server 4 according to the second exemplary embodiment includes an observer server 20 which is always active. In contrast, in the first embodiment, the server 4 of the second embodiment includes a video server 10 which is activated when a client is connected to the server and requests images or video stream. Since the observer server 20 is constantly active, the observer server 20 transmits all the data captured by the ICA 2, including scanned barcodes and captured photographic images to an observer client 22 which is included in the client 6.

The client 6 contains the observer client 22 which is software designed to communicate with the observer server 20 and to display the transmitted data. Since the observer server 20 transmits all the data it acquires from the ICA 2 to the client 6 including textual data (e.g., representing decoded barcode), the client 6 may either display all the images received or it may include filter software that displays only the desired output transmitted by the server 4. The observer server 20 and the observer client 22 may preferably be written in a high-level language in order to insure that the software is sufficiently fast and powerful.

Figure 5:
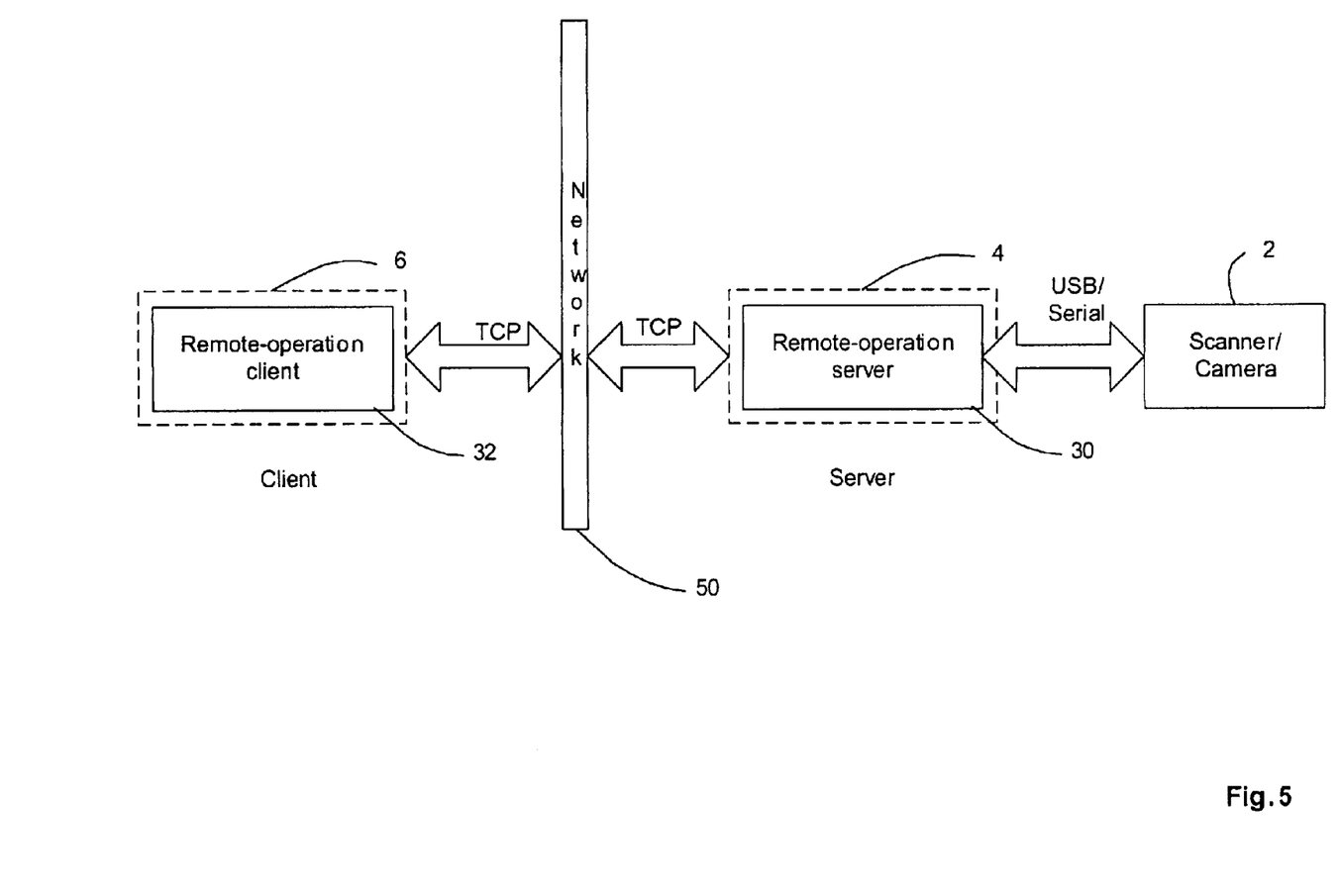
FIG. 5 shows a further exemplary embodiment of a system according to the present invention including a remote operation server.

FIG. 5 shows a third exemplary embodiment of the present invention which provides remote access to the ICA 2 controls. The ICA 2, the server 4 and the client 6 according to this embodiment may preferably be set up in substantially same manner as the first and second embodiments shown in FIGS. 1 and 2. The server 4 contains a remote-operation server 30 and the client 6 contains a remote-operation client 32. The remote-op server 30 may have two functions. First, the remote-op server 30 communicates with the ICA 2 in a manner substantially similar to that described above in regard to the previous embodiments of the present invention. Second, the remote-op server 30 communicates with the remote-op client 32, thus, allowing the remote-op client 32 to obtain the data captured by the ICA 2 and to display the data in order to insure that the software is sufficiently fast and powerful.

In contrast to the previous embodiments, the information flows in both directions in this embodiment (i.e., from the client 6 to the ICA 2 and from the ICA 2 to the client 6). The remote-op client 32 accepts user input and communicates this data to the remote-op server 30. The remote-op server 30 then transmits the user input to the ICA 2. Hence, the user may control the operation of the ICA 2 from a remote location. The remote-op server 30 and the remote-op client 32 may preferably be written in a high-level language.

The first embodiment of the present invention shown in FIG. 3 may be implemented in an environment where there is an existing infrastructure of ICAs 2 and there is a risk of security failure. One such possible environment is a supermarket. A modern supermarket may contain the ICA 2, for example, at each check-out lane. Supermarkets are also very susceptible to shoplifting because of the multitude of items that may easily be concealed by shoplifters. Thus, unmanned check-out lanes present a security risk in an already lax theft prevention system. By utilizing the present invention, the ICA 2 located in an unmanned check-out lane may automatically switch to a camera mode and record the surroundings when it is not being used to captures barcode labels. A supermarket employee may be monitoring the video feeds from the ICAs 2 positioned in all unmanned check-out lanes through the client 6 which would display a web client 12. The video stream generally may be subsampled for speedy transmission and to lessen network bandwidth requirement. When one video stream from one ICA 2, among several video streams being displayed in the web client 12, shows interesting activity, the employee could click a pointing device (e.g., a mouse) in the video area, which in turn sends a command to the video server 10 to request a zoomed-in, or full resolution, image from the ICA 2.

The second embodiment of the present invention shown in FIG. 4 may be utilized in a working environment where an employee requires remote access to another terminal. For instance, if a piece of electronic equipment (e.g., a cash register) at a supermarket check-out lane is no longer operational, all the customers waiting to check-out with their groceries may need to be relocated to another lane. As described above, in the embodiment shown in FIG. 4, the server 4 may transmit barcodes as well as images which allows the employee to transmit barcodes to a remote client 6. To avoid inconvenience, the employee may use the ICA 2, located in the check-out lane with a broken client 6, to scan barcode labels, and then transmit the barcodes to another client 6, located in another lane where another client 6 is functioning properly. Hence, the remote client 6 may serve as a quick substitute for the broken client 6.

The third embodiment of the present invention, which is shown in FIG. 5, may be utilized in a situation where there is no user available to control the ICA 2. For instance, in an automated factory assembly line where the ICAs 2 are used to keep track of the inventory utilized in the manufacturing process (i.e., so that the production process may be adjusted automatically) usually there are no users of ICAs 2. Instead, there is only a remote operator. In some cases, the remote operator may need to input specific information or assist certain ICAs 2. The present invention provides the remote operator with the ability to remotely communicate with the ICAs 2 via the client 6. Thus, a single remote operator may keep track of a substantial portion of an assembly line, minimizing the amount of personnel needed to perform this task.

Furthermore, the present invention may be utilized by a law enforcement agency. For example, a central police station may monitor several scanners mounted on patrol cars or on police officers in the field. Since a number of police officers are already equipped with barcode scanners and many other devices, the present invention would assist in reducing the number of devices they need to carry. Their scanners would have the functionality of the ICA 2 and capable of transmitting video which is very valuable to the law enforcement agency. For example, the video may be used as evidence in criminal trials, allows an operator of the central station to summon additional backup, etc.

It will be apparent to those skilled in the art that various modifications and variations can be made in the structure and the methodology of the present invention, without departing from the spirit or scope of the invention. Thus, it is intended that the present invention cover the modifications and variations of this invention provided they come within the scope of the appended claims and their equivalents.

What is claimed is:

1. A method for monitoring a location, comprising the steps of:

providing a scanner including a digital imager at the location;

detecting, based on information from the imager, whether the scanner is in a scanning mode in which information encoded on a scanned item is decoded, wherein the detecting is performed by a processor; and when the scanner is detected not to be in the scanning mode, controlling the digital imager to operate in a monitoring mode in which images of the location are outputted by the digital imager.

2. The method of claim 1, wherein the information encoded on the scanning item is a barcode.

3. The method of claim 1, wherein the detecting step is performed automatically.

4. The method of claim 1, wherein the controlling step includes the substeps of providing the images to a computing arrangement.

5. The method of claim 4, wherein the computing arrangement includes a web server and a video server, and wherein the method further comprising the steps of:

allowing access to the computing arrangement by at least one client computer using the web server, the at least one client computer including a web client and a video client; and providing the image to the video client by the video server.

6. The method of claim 4, wherein the computing arrangement includes an observer serve, and wherein the method further comprising the step of:

providing the images to at least one client computer which includes an observer client, the observer server being configured to provide the images to the observer client.

7. The method of claim 4, wherein the computing arrangement includes a remote-operation server, and wherein the method further comprising the step of:

providing the images to at least one client computer which includes a remote-operation client, the remote-operation server being configured to provide the images to the remote-operation client and to control the scanner based on signals transmitted by the remote-operation client.

8. The method of claim 1, wherein the scanner communicates with a computing arrangement, the detecting step being performed upon receiving a control signal transmitted by the computing arrangement.

9. The method of claim 1, wherein the detecting step is performed every predetermined time period.

10. The method of claim 1, further comprising the step of:

when the scanner is in the monitoring mode, switching into scanning mode upon detecting the encoded information.

11. The method of claim 1, further comprising the steps of:
   before outputting the images of the location, reducing a size of the images; and
   upon selection of a particular reduced image, providing a corresponding full image.

12. The method of claim 1, further comprising the step of:
   before outputting the images of the location, (i) selecting at least one image of the acquired images and (ii) reducing a size of at least one image; and
   upon selection of a particular image of the at least one image, providing a corresponding sequence of the images with at least one of a higher repetition rate and a higher resolution.

13. A system for monitoring a location, comprising:
   a scanner including a digital imager, a processor and a communication device, the scanner being situated at the location; and
   a computing arrangement for accessing the scanner,
   wherein the process or detects when the scanner is in a scanning mode in which information encoded on a canned item is decoded and wherein, when the scanner is detected not to be in the scanning mode, the processor controls the digital imager to operate in a monitoring mode in which images of the location are generated for output to the computing arrangement via the communication device.

14. The system of claim 13, wherein the information encoded on the scanning item is a barcode.

15. The system of claim 13, wherein the computing arrangement includes a web server and a video server, the computing arrangement allowing an access to the web server by at least one client computer, the at least one computer including a web client and a video client, the vide server being configured to provide the images to the video client.

16. The system of claim 13, wherein the computing arrangement includes an observer server, the computing arrangement providing the images to at least one client computer which includes a observer client, the observer server being configured to provide the images to the server client.

17. A system for monitoring a location, comprising:
   a scanner including a digital imager, a processor and a communication device, the scanner being situated at the location; and
   a computing arrangement for accessing the scanner including a remote-operation server, the computing arrangement providing the images to at least one client computer with includes a remote-operation client, the remote-operation server being configured to provide the image to the remote-operation client and to control the scanner based on signals transmitted by the remote-operation client,
   wherein the processor detects when the scanner is in a scanning mode in which information encoded on a scanned item is decoded and wherein, when the scanner is detected not to be in the scanning mode, the processor controls the digital imager to operate in a monitoring mode in which images of the location are generated for output to the computing arrangement via the communication device.

18. The system of claim 13, wherein the processor detects if the scanner is the scanning mode only upon receiving a corresponding signal from the computing arrangement.

19. The system of claim 13, wherein when the scanner is in the monitoring mode and the processor detects encoded information, the scanner is automatically switched into the scanning mode.

20. The system of claim 13, wherein processor reduces a size of the images of the location, and wherein, upon a selection of a particular reduced image, a corresponding full image is provided by the processor.

21. The system of claim 13, wherein the processor selects at least one image of the acquired images and reduces a size of the at least one image, and wherein, upon a selection of a particular image of the at least one image, the processor provides a corresponding sequence o images with at least one of a higher repetition rate and a higher resolution.

22. A scanning arrangement, comprising:
   a digital imager; and
   a processor detecting whether the scanning arrangement is in a scanning mode in which information encode on a scanned item is decoded, wherein, when the scanning arrangement is detected not to be in the scanning mode, the processor controls the digital imager to operate in a monitoring mode in which images of the location are outputted by the digital imager.

23. The scanning arrangement of claim 22, further comprising: a lenses in a bifocal arrangement.

24. The scanning arrangement of claim 22, wherein the images of the location are provided to at least one client computer.

25. The scanning arrangement of claim 24, wherein the scanning arrangement and the at least one client computer communicate with each other via a communication network.

26. The scanning arrangement of claim 22, wherein the processor detects the scanning mode automatically.

27. The scanning arrangement of claim 22, further comprising:
   a computing arrangement including a web server and a video server, the computing arrangement providing an access to the web server by at least one client computer, the at least one computer including a web client and a video client, the video server being configured to provide the images to the video client.

28. The scanning arrangement of claim 22, further comprising:
   a computing arrangement including an observer server, the computing arrangement connectable to at least one client computer which includes an observer client, the observer server being configured to provide the images to the observer client.

29. The scanning arrangement of claim 22, further comprising:
   a computing arrangement including a remote-operation server, the computing arrangement connectable to at least one client computer which includes a remote-operation client, the remote-operation server being configured to provide the images to the remote-operation client and to control the scanning arrangement based on signals transmitted by the remote-operation client.

30. The scanning arrangement of claim 29, wherein the processor detects when the scanning arrangement is th scanning mode only upon receiving a corresponding signal from the computing arrangement.

31. The scanning arrangement of claim 22, wherein the processor detects when the scanning arrangement is in the scanning mode every predetermined time period.

32. The scanning arrangement of claim 22, wherein when the scanning arrangement is in the monitoring mode and the processor detects the encoded information, the scanning arrangement switches into the scanning mode.

* * * * *

UNITED STATES PATENT AND TRADEMARK OFFICE
CERTIFICATE OF CORRECTION

PATENT NO.    : 6,772,950 B2
DATED         : August 10, 2004
INVENTOR(S)   : He, Duanfeng It is certified that error appears in the above-identified patent and that said Letters Patent is hereby corrected as shown below:

Column 6,
Lines 34-48, please correct claims 5 and 6 as follows:

5. The method of claim 4, wherein the computing arrangement includes a web server and a video server, and wherein the method further comprising the steps of:
   allowing access to the computing arrangement by at least one client computer using the web server, the at least one client computer including a web client and a video client; and
   providing the images to the video client by the video server."

6. The method of claim 4, wherein the computing arrangement includes an observer server, and wherein the method further comprising the step of:
   providing the images to at least one client computer which includes an observer client, the observer server being configured to provide the images to the observer client.

Column 7,
Lines 14-40, please correct claims 13, 15 and 16 as follows:

13. A system for monitoring a location, comprising:
   a scanner including a digital imager, a processor and a communication device, the scanner being situated at the location; and
   a computing arrangement for accessing the scanner,
   wherein the processor detects when the scanner is in a scanning mode in which information encoded on a scanned item is decoded and wherein, when the scanner is detected not to be in the scanning mode, the processor controls the digital imager to operate in a monitoring mode in which images of the location are generated for output to the computing arrangement via the communication device.

15. The system of claim 13, wherein the computing arrangement includes a web server and a video server, the computing arrangement allowing an access to the web server by at least one client computer, the at least one computer including a web client and a video client, the video server being configured to provide the images to the video client.

16. The system of claim 13, wherein the computing arrangement includes an observer server, the computing arrangement providing the images to at least one client computer which includes an observer client, the observer server being configured to provide the images to the observer client.

UNITED STATES PATENT AND TRADEMARK OFFICE
CERTIFICATE OF CORRECTION

PATENT NO. : 6,772,950 B2
DATED : August 10, 2004
INVENTOR(S) : He, Duanfeng

It is certified that error appears in the above-identified patent and that said Letters Patent is hereby corrected as shown below:

Column 8,
Lines 11-22, pease correct claims 22 and 23 as follows:

22. A scanning arrangement, comprising:
   a digital imager; and
   a processor detecting whether the scanned arrangement is in a scanning mode in which information encoded on a scanned item is decoded, wherein, when the scanning arrangement is detected not to be in the scanning mode, the processor controls the digital imager to operate in a monitoring mode in which images of the location are outputted by the digital imager.

23. The scanning arrangement of claim 22, further comprising:   lenses in a bifocal arrangement.

Lines 55-58, please correct claim 30 as follows:

30. The scanning arrangement of claim 29, wherein the processor detects when the scanning arrangement is in the scanning mode only upon receiving a corresponding signal from the computing arrangement.

Signed and Sealed this

Fourth Day of January, 2005

JON W. DUDAS
*Director of the United States Patent and Trademark Office*